US012768118B2

(12) United States Patent
Litchfield, Jr.

(10) Patent No.: US 12,768,118 B2
(45) Date of Patent: Oct. 20, 2026

(54) HANDHELD SNOW REMOVING SYSTEM

(71) Applicant: Mitchell Roland Litchfield, Jr., Forman, ND (US)

(72) Inventor: Mitchell Roland Litchfield, Jr., Forman, ND (US)

( * ) Notice: Subject to any disclaimer, the term of this patent is extended or adjusted under 35 U.S.C. 154(b) by 952 days.

(21) Appl. No.: 17/856,336

(22) Filed: Jul. 1, 2022

(65) Prior Publication Data

US 2023/0011672 A1 Jan. 12, 2023

Related U.S. Application Data

(60) Provisional application No. 63/218,738, filed on Jul. 6, 2021.

(51) Int. Cl.

| | |
|---|---|
| ***E01H 5/02*** | (2006.01) |
| ***B08B 1/12*** | (2024.01) |
| ***B08B 1/34*** | (2024.01) |
| ***B08B 5/04*** | (2006.01) |
| ***B08B 13/00*** | (2006.01) |
| ***B60S 3/04*** | (2006.01) |

(52) U.S. Cl.
CPC ................. *E01H 5/02* (2013.01); *B08B 1/12* (2024.01); *B08B 5/04* (2013.01); *B08B 13/00* (2013.01); *B08B 1/34* (2024.01); *B60S 3/04* (2013.01)

(58) Field of Classification Search
CPC .... B08B 5/04; B08B 1/32; B08B 1/12; B08B 13/00; B60S 3/04
USPC .................................................... 37/196–285
See application file for complete search history.

(56) References Cited

U.S. PATENT DOCUMENTS

| | | | | |
|---|---|---|---|---|
| 3,592,566 A * | 7/1971 | Beardslee | F04D 29/5806 | 415/55.5 |
| 4,329,792 A * | 5/1982 | Berner | E01H 5/04 | 37/246 |
| 4,869,003 A * | 9/1989 | O'Loughlin | E01H 5/098 | 37/255 |
| 5,448,794 A * | 9/1995 | Walch et al. | A47L 9/22 | 15/326 |
| 6,643,958 B1 * | 11/2003 | Krejci | E01H 5/098 | 37/285 |
| 2006/0096136 A1 * | 5/2006 | Shaffer et al. | E01H 1/12 | 37/244 |
| 2009/0249658 A1 * | 10/2009 | Embry | E01H 5/04 | 37/246 |
| 2011/0277357 A1 * | 11/2011 | Schmeichel | E01H 5/06 | 37/231 |
| 2012/0279092 A1 * | 11/2012 | Kueper | E01H 5/066 | 37/233 |

* cited by examiner

*Primary Examiner* — Tara Mayo
(74) *Attorney, Agent, or Firm* — Foley & Lardner LLP

(57) ABSTRACT

A handheld snow removing system includes an intake scoop with a rotating intake auger, a discharge chute configured to direct a flow of material to a point outside of the handheld snow removing system, a fan chamber disposed between the intake scoop and the discharge chute, and an energy-conversion device configured to drive elements of the fan chamber and the rotating intake auger. The fan chamber includes a fan configured to create a suction force within the fan chamber to create the flow of material from the intake scoop, through the fan chamber, and out through the discharge chute.

19 Claims, 5 Drawing Sheets

HANDHELD SNOW REMOVING SYSTEM

CROSS REFERENCE TO RELATED APPLICATIONS

This patent application claims the benefit of U.S. Prov. Ser. No. 63/218,738, filed Jul. 6, 2021. The application is hereby incorporated by reference herein.

SUMMARY

In some aspects of the present description, a handheld snow removing system is provided, the handheld snow removing system including an intake scoop with a rotating intake auger, a discharge chute configured to direct a flow of material to a point outside of the handheld snow removing system, a fan chamber disposed between the intake scoop and the discharge chute and an energy-conversion device configured to drive elements of the fan chamber and the rotating intake auger. The fan chamber includes a fan configured to create a suction force within the fan chamber to create the flow of material from the intake scoop, through the fan chamber, and out through the discharge chute.

In some aspects of the present description, a snow removing system designed to be held by an operator is provided, the snow removing system including an intake scoop, a discharge chute, and a fan chamber disposed between the intake scoop and the discharge chute, the fan chamber configured to create an internal suction force necessary to move snow from the intake scoop, through the fan chamber, and expel it through the discharge chute.

DETAILED DESCRIPTION

Figure 1:
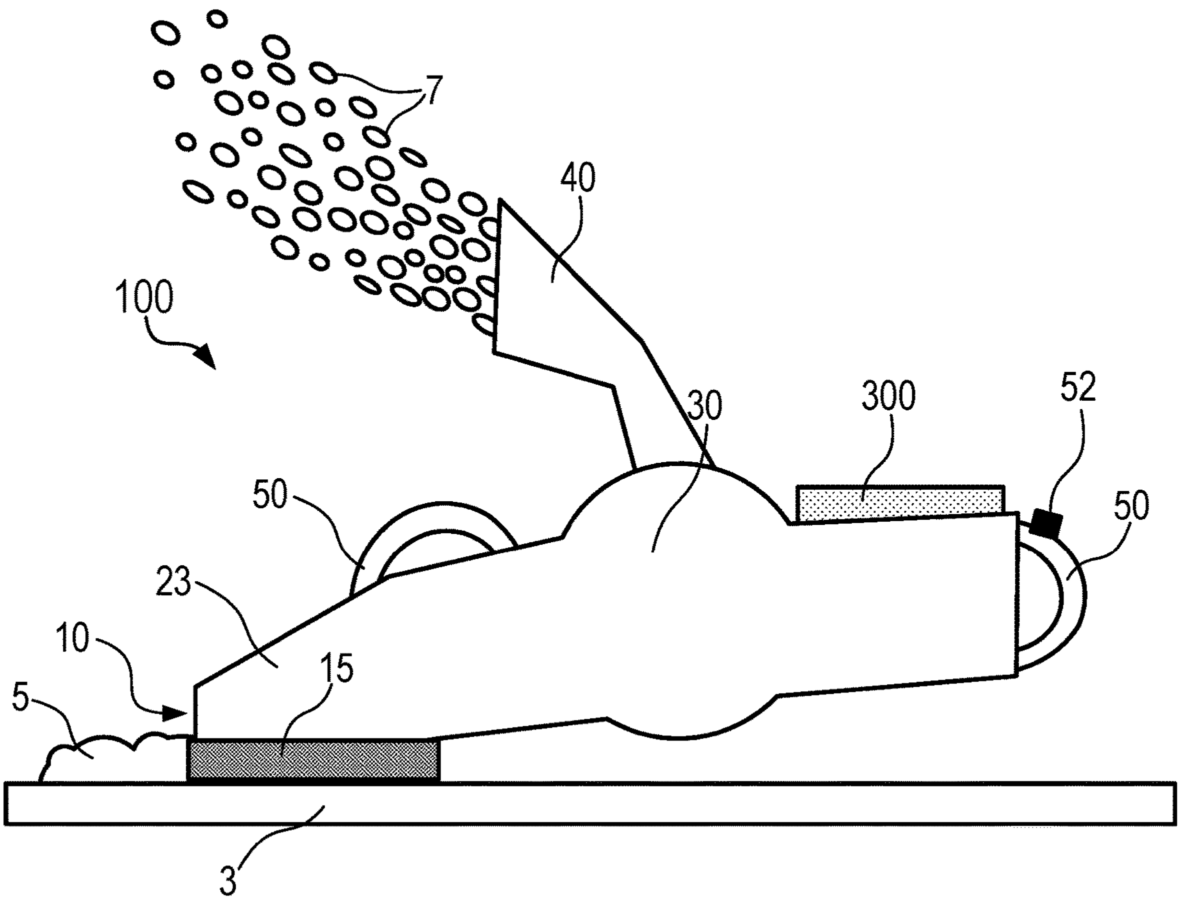
FIG. 1 is a side view of a handheld snow removing system, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some climates, automated snow removal (e.g., a powered snowblower) is essential to keep sidewalks, driveways, and other access areas clear of snow. A powerful snowstorm can deposit inches or even feet of snow in just a few hours, and strong winds accompanying the storm can cause the snow to drift even higher. Trying to shovel this snow (which can sometimes be very wet and heavy) manually can be difficult or even impossible for some. However, a typical snowblower is large and intended to remove snow from large ground surfaces, such as a driveway, and cannot be used to remove accumulated snow from an elevated or hard to reach surface (e.g., the top of a vehicle, the surface of a deck, etc.) For one, even the smallest single-stage electric snow thrower is at least 15 kilograms in weight (and many snowblowers are well over 30-40 kilograms) and is not intended to be lifted off the ground during operation. Snow throwers and snowblowers have extended handles with operator controls and are designed to be operated by a person walking behind them. Even if the snowblower could be lifted by a strong human and placed on an elevated surface (e.g., the top of a car), the metal intake section and skid shoes (i.e., the metallic extensions on the bottom of the intake section designed to slide over the sidewalk or driveway) would damage the surface, and the operator controls would be elevated out of reach for a human operator standing on the ground attempting to operate the machine.

According to some aspects of the present description, a handheld snow removing system is described which addresses these limitations. In some embodiments, a handheld snow removing system may include an intake scoop with a rotating intake auger, a discharge chute configured to direct a flow of material to a point outside of the handheld snow removing system, a fan chamber disposed between the intake scoop and the discharge chute and an energy-conversion device configured to drive elements of the fan chamber and the rotating intake auger. In some embodiments, the fan chamber may include a fan configured to create a suction force within the fan chamber to create the flow of material (e.g., a flow of snow) from the intake scoop, through the fan chamber, and out through the discharge chute.

In some embodiments, the intake scoop may further include a flexible front edge (e.g., a rubber lip) configured to lift and direct material into the intake scoop when the handheld snow removing system is directed along a surface to be cleaned (e.g., the surface of a car covered in snow, or the top of a picnic table). In some embodiments, the flexible front edge may be formed in a U-shape, with the open end of the “U” pointing forward in the direction the snow removing system is moved during operation, such that the arms of the U cut through the snow and allow the snow to be pulled into the rotating intake auger. In some embodiments, the rotating intake auger may include a rotating brush, wherein bristles from the rotating brush move across the surface to be cleaned, sweeping snow up into the rotating intake auger.

In some embodiments, the handheld snow removing system may be configured to be lifted and operated by an operator using either one or two hands. In some embodiments, the handheld snow removing system may be configured to be lifted by an operator without assistance to remove snow from an elevated surface. That is, the size and/or weight of the handheld snow removing system shall be such that an operator can readily lift and operate the snow removing system without assistance. For example, in some embodiments, the handheld snow removing system may weigh less than about 10 kilograms, or less than about 8 kilograms, or less than about 6 kilograms. In some embodiments, the maximum dimension of the snow removing system (e.g., the length from the intake side of the system to the opposing end) may be less than about 0.75 meters, or less than about 0.70 meters, or less than about 0.65 meters, or less than about 0.6 meters.

In some embodiments, the energy-conversion device of the handheld snow removing system may be an electric motor powered by one or more batteries (e.g., one or more rechargeable lithium ion batteries.) In some embodiments, the energy-conversion device may be an electric motor connected by a cord to an external source of electricity (e.g., a 110-volt electrical outlet). In some embodiments, the total electrical power needed to operate the fan and the rotating intake auger may be about 40 volts, or about 50 volts, or about 60 volts.

In some embodiments, the energy-conversion device may be a gasoline-powered engine. In some embodiments, the energy-conversion device may drive a motor which rotates the fan within the fan chamber at a speed which creates a sufficient suction force within the fan chamber, such that material (e.g., snow) is drawn up into the fan chamber after being pulled into the handheld snow removing device by the rotating intake auger and expelled out through the discharge chute. The suction force created within the fan chamber distinguishes the handheld snow removing system from traditional full-size snow throwers and snowblowers. Full-size snow throwers and snowblowers do not create a suction force as the rotating impellers (e.g., in a two-stage snow-blower) are open to the air at the front of the snowblower's intake section, and the discharge chute is generally an open-sided curved deflector at the top of a large open discharge hole, and this configuration does not allow a suction force to form. Instead, the impeller of a snowblower simply catches and "throws" the snow up and out of the discharge hole. The large metal augers and impellers of a traditional snowblower, housed in large, open sections of the snowblower, would not work well for a handheld snow removing system, where an operator's hands need to be close to the operating parts. The fan and fan blades of the handheld snow removing system are sized to move quickly across the interior surface of the enclosed fan chamber and to have sufficient speed (revolutions per minute, or RPM) to create a powerful suction force, where air (and the material such as snow that is pulled into that air stream) creates a strong flow of material from the intake scoop, through the fan chamber, and out through the discharge chute.

In some embodiments, the rotating intake auger may also be connected to the energy-conversion device, either directly (e.g., geared or connected to the rotating motor) or indirectly (e.g., attached to the rotating fan through a belt or gear system).

In some embodiments, the discharge chute is adjustable (i.e., the direction of discharge from the discharge chute may be adjusted.) In some embodiments, the handheld snow removing system may include an operator control to change the direction of discharge of the discharge chute. In some embodiments, the discharge chute may be mounted on a rotating bearing or within a circular channel, wherein the direction of the discharge chute may be change manually (e.g., the operator grabbing the discharge chute or an operator lever mounted to the discharge chute and manually turning it to the desired direction). In other embodiments, an electric motor may be used to turn the discharge chute to the desired direction based on a command from the user (e.g., pressing an operator control to engage the motor to rotate the chute in the desired direction). The handheld snow removing system may further include a set of operator controls (e.g., an on/off switch, a speed/power switch, a control to change the direction of the discharge chute, etc.) In some embodiments, the handheld snow removing system may include one or more user handles for holding and operating the snow removing system. In some embodiments, one or more of the user handles may include operator controls positioned to be easily manipulated while holding the handheld snow removing system.

According to some aspects of the present description, a snow removing system designed to be held by an operator may include an intake scoop, a discharge chute, and a fan chamber disposed between the intake scoop and the discharge chute, the fan chamber configured to create an internal suction force necessary to move snow from the intake scoop, through the fan chamber, and expel it through the discharge chute. In some embodiments, the fan chamber may further include an impeller (e.g., fan blades or similar) driven by an electric motor. In some embodiments, the electric motor may be powered by one or more batteries (e.g., a series of lithium ion rechargeable batteries). In some embodiments, the electric motor may be connected by an electrical cord and receive power from an external source of electricity (e.g., such as a standard household electrical outlet). In some embodiments, the intake scoop may further include a rotating intake auger. In some embodiments, the rotating intake auger may include a series of soft, rotating brushes intended to sweep material (e.g., snow) off a surface (e.g., the top of a car) and push it into the path of the suction force created by the fan chamber (i.e., so that it enters the material flow created by the powerful suction created in the fan chamber).

In some embodiments, the snow removing system may have a size and/or weight enabling handheld use by a typical operator without assistance. That is, the snow removing system may be configured to be lifted by an operator without assistance to remove snow from an elevated surface, and such that it does not cause damage to the surface. In some embodiments, the snow removing system may have an extended flexible lip (e.g., a soft but durable material such as silicone or rubber) surrounding the edge of the intake scoop that is intended to move along the surface to be cleaned. The material may be configured to glide smoothly over most surfaces without damaging the surface (e.g., scratching the paint on a car) and with minimal friction, while being flexible enough to conform to small dips or bumps on the surface. In some embodiments, the flexible lip may surround the front opening in the intake scoop with a "U" shape, such that the open end of the U faces in the direction of travel of the snow removing system when being operated. In some embodiments, the tops of the U shape may extend forward beyond the opening of the intake scoop, such that the extensions "cut" through the snow and guide the snow inside the U up into the rotating intake auger. In some embodiments, a maximum dimension of the snow removing system is less than about 0.75 meters, or less than about 0.70 meters, or less than about 0.65 meters, or less than about 0.6 meters. In some embodiments, the overall weight of the snow removing system may be less than about 10 kilograms, or less that about 8 kilograms, or less than about 6 kilograms.

Turning now to the figures, FIG. 1 is a side view of an embodiment of a handheld snow removing system 100, according to the present description. In some embodiments, handheld snow removing system 100 includes an intake scoop 23 with a front opening 10, a flexible front edge 15, a fan chamber 30, an energy-conversion device 300, and a discharge chute 40. In operation, handheld snow removing system 100 is held by an operator and directed across a surface 3 to be cleaned, such that the flexible front edge 15 is substantially in contact with surface 3 and material 5 (e.g., snow to be removed) is directed by flexible front edge 15 into front opening 10 where it moves up into intake scoop 23. Additional details on intake scoop 23 are provided elsewhere herein. Fan chamber 30 creates a suction force sufficient to pull material 5 through intake scoop 23, into fan chamber 30, and out through discharge chute 40 as discharged material 7 (e.g., ejected snow directed away from handheld snow removing system 100). Suction is created within the fan chamber 30 by rotating fan blades or an impeller (see FIG. 2 for additional details) via an electric motor powered by energy conversion device 300. In some embodiments, energy conversion device 300 may be an electric motor powered by one or more batteries or an external source of electricity. In other embodiments, energy conversion device 300 may be a motor powered by a gasoline powered engine.

In some embodiments, handheld snow removing system 100 may further include one or more operator handles 50. In some embodiments, handheld snow removing system 100 may further include one or more operator controls 52.

Figure 2:
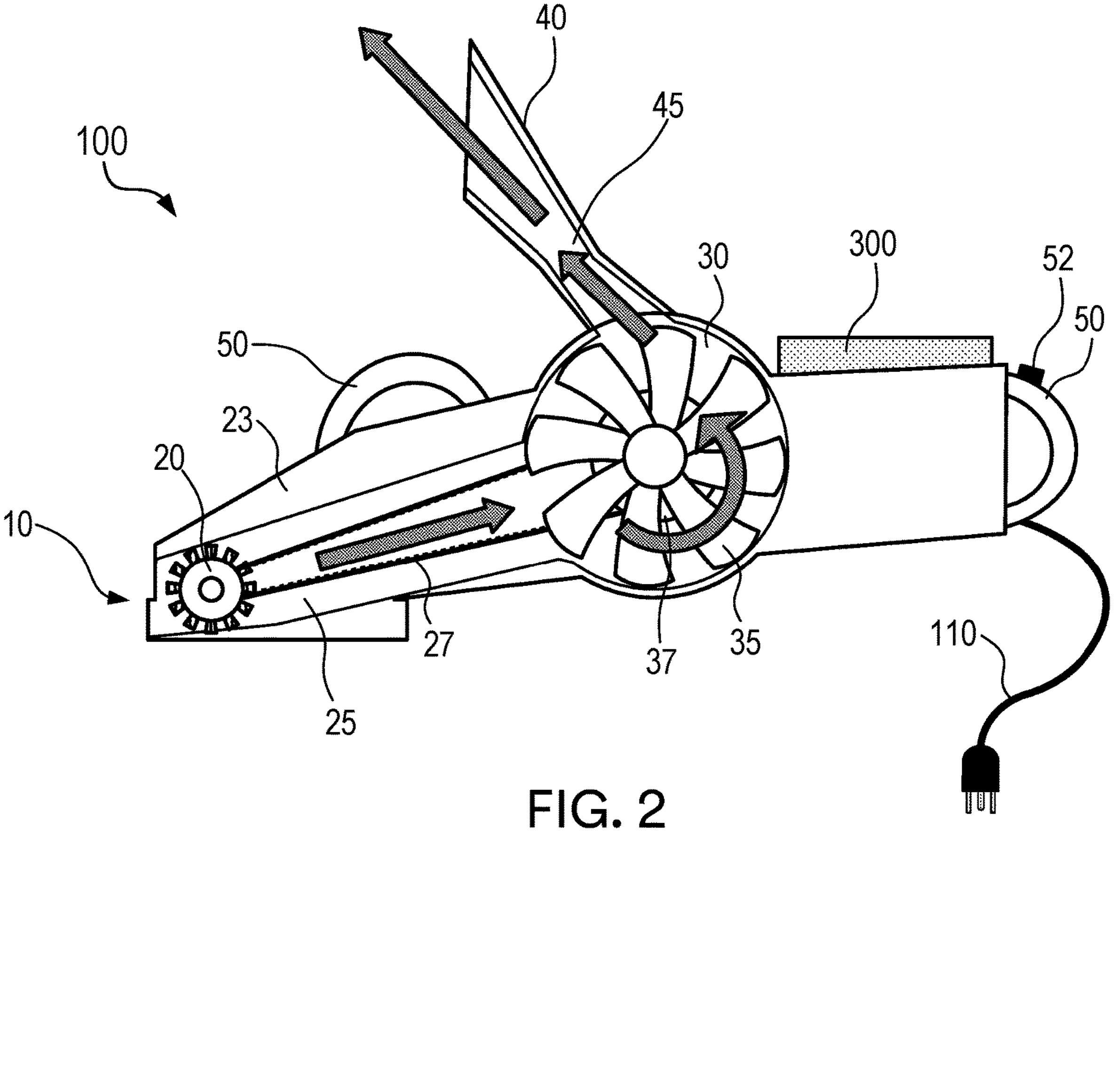
FIG. 2 is a side, cut-away view of the handheld snow removing system of FIG. 1, in accordance with an embodiment of the present description.

FIG. 2 is a side, cut-away view of the handheld snow removing system 100 of FIG. 1, showing additional internal details. As shown in FIG. 2, intake scoop 23 may include a rotating intake auger 20. Rotating intake auger 20 may be configured to rotate rapidly, pushing brushes or soft blades over the surface to be cleaned, pulling snow and other material from the surface into intake scoop 23. In some embodiments, intake scoop 23 includes an internal conduit 25 between rotating intake auger 20 and fan chamber 30. Arrows starting in internal conduit 25 show the flow of material starting within internal conduit 25, up into and around at least a portion of fan chamber 30, and out through discharge chute 40. In some embodiments, discharge chute 40 may have a closed discharge conduit 45, or may include an opening surrounded by a deflector used to direct the ejected material in a pre-determined direction.

In some embodiments, fan chamber 35 may include a fan 35 configured to rotate at a relatively high rate of speed (high RPM level), creating a powerful suction force within fan chamber 30, creating the flow of material from internal conduit 25, into fan chamber 30, and out through discharge chute 40. In some embodiments, fan 35 may be driven by motor 37, which may receive power from energy conversion device 300 (e.g., batteries, external power, or gasoline engine). In some embodiments, handheld snow removing system 100 may include an external power cord 110 which may be attached (i.e., plugged in) to an external power source, such as an electrical socket. In some embodiments, power cord 110 may supply power to electric motor 37 directly, or it may supply power to one or more rechargeable batteries which in turn supply power to electric motor 37. In some embodiments, a connection 27 (e.g., a belt or gearing system) may connect the rotating intake auger 20 to the fan 30 and/or electric motor 37 so that the motor 37 can also drive the rotating intake auger 20.

In some embodiments, handheld snow removing system 100 may include one or more user handles 50, and one or more user controls 52. In some embodiments, user controls 52 may be located on or near user handles 50. In other embodiments, user controls 52 may be disposed in another location on handheld snow removing system 100. Example user controls may include, but are not limited to, an on/off (power) switch, a speed control, power level indicators (e.g., warning lights or LEDs), and controls to change the direction of the discharge chute 40.

Figure 3:
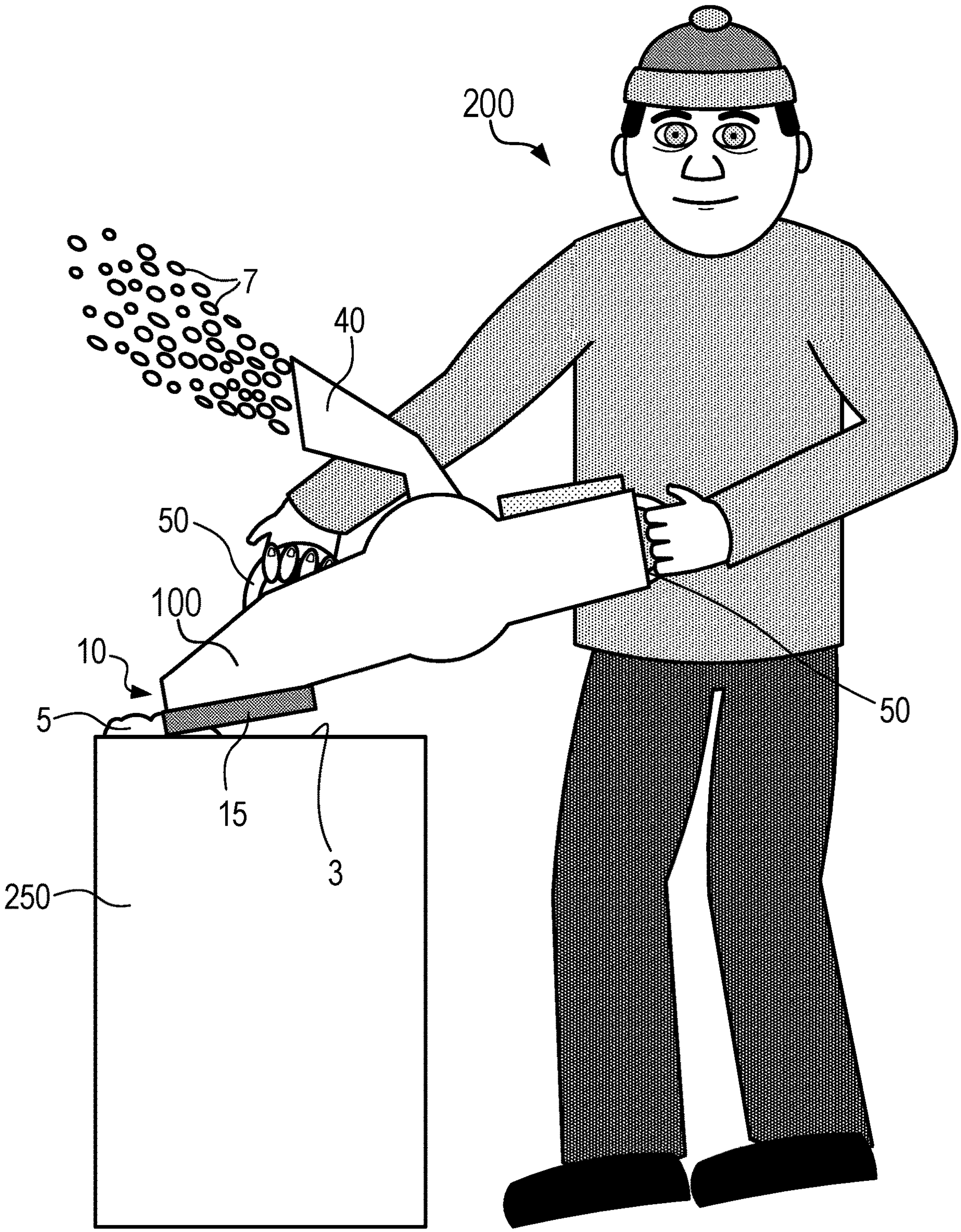
FIG. 3 illustrates a typical operating scenario for a handheld snow removing system, in accordance with an embodiment of the present description.

FIG. 3 illustrates a typical operating scenario for an embodiment of a handheld snow removing system 100, according to the present description. An operator 200 operates handheld snow removing system 100 by holding the device in one or both hands (e.g., grabbing handheld snow removing system 100 by user handles 50). Operator 200 moves handheld snow removing system 100 over a surface 3 of an object 250 (e.g., a vehicle, patio furniture, a gas grill, etc.) to be cleaned such that flexible front edge 15 glides on or very near surface 3. Snow 5 is directed by flexible front edge 15 into front opening 10 of handheld snow removing system 100 and is eventually ejected as ejected material 7 through discharge chute 40. As the handheld snow removing system 100 is to be held aloft and operated by a single operator 200, the system must be configured to be of a size and weight that allows easy operation by operator 200. In some embodiments, for example, handheld snow removing system 100 may weigh less than about 10 kilograms, or less that about 8 kilograms, or less than about 6 kilograms. In some embodiments, handheld snow removing system 100 may have a maximum dimension (e.g., a length) less than about 0.75 meters, or less than about 0.70 meters, or less than about 0.65 meters, or less than about 0.6 meters.

Figure 4A:
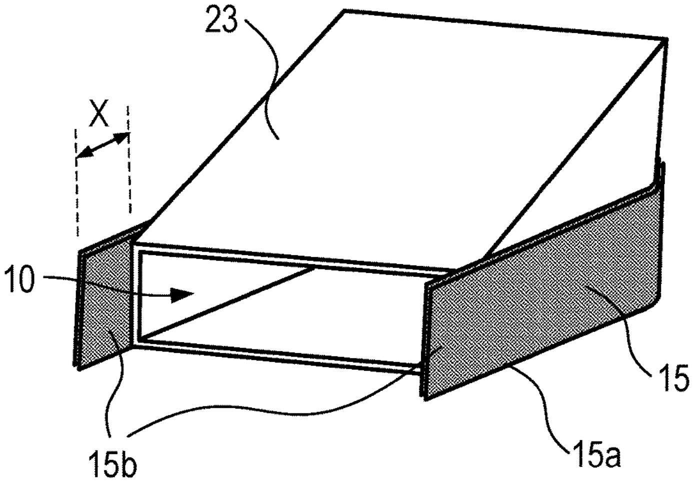
FIGS. 4A-4C provide views of an intake scoop portion of a handheld snow removing system, in accordance with an embodiment of the present description.
Figure 4B:
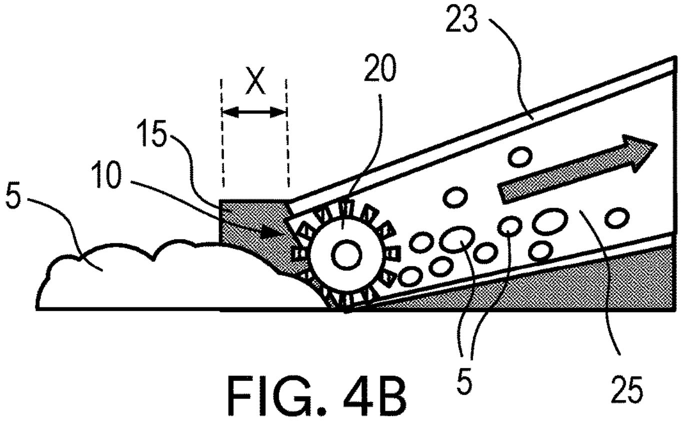
Figure 4C:
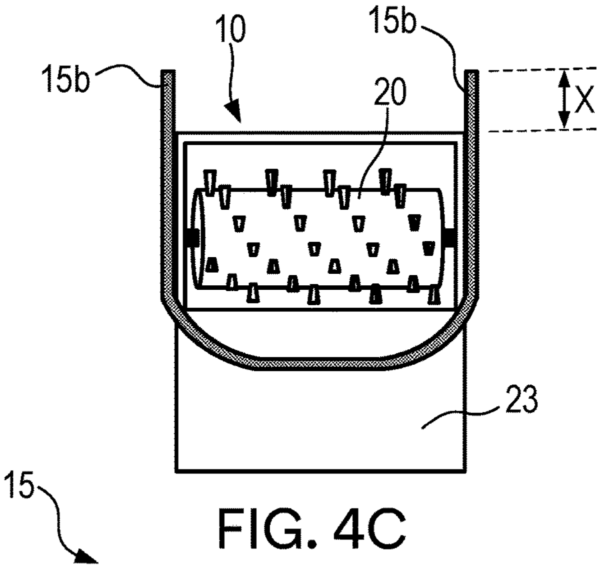

FIGS. 4A-4C provide views of the intake scoop portion 23 of an embodiment of a handheld snow removing system, according to the present description. The following discussion pertains to FIGS. 4A-4C, which should be reviewed together. In some embodiments, intake scoop 23 includes a flexible front edge 15, which is disposed around front opening 10 such that material (e.g., snow to be removed) is directed by flexible front edge 15 into front opening 10. Flexible front edge 15 may have a lower edge **15*a* that is intended to make direct contact with a surface to be cleaned and which may extend blow intake scoop 23 by a small amount to prevent the bottom surface of intake scoop 23 to damage the surface being cleaned. In some embodiments, the front ends 15*b* of flexible front edge 15 may extend out from the front opening 10 by an amount X, creating blade-like extensions that cut through the snow as handheld snow removing system 100 is moves forward and directs the snow into front opening 10. In some embodiments, flexible front edge 15 may be U-shaped, as shown in FIG. 4C, with the open end of the "U" facing forward in the direction of travel of handheld snow removing system 100. In other embodiments, flexible front edge 15 may include two or more separate pieces, such as a single straight strip of material on either side of front opening 10 (not shown). No matter the configuration of flexible front edge 15, its purpose is to provide non-destructive contact with the surface to be cleaned and to direct snow 5 into front opening 10 where it will be swept by rotating intake auger 20 up into internal conduit 25 where it can enter the flow of material (arrow in FIG. 4B) leading into the fan chamber (see fan chamber 30 of FIG. 1, for example). It should be noted that the dimensions and proportions shown for the components of handheld snow removing system 100 in all of the figures herein are not intended to be exact, and are meant only to show the general layout and types of system components that may be included. The dimensions/proportions (e.g., the length of internal conduit 25 between intake auger 20 and fan chamber 30**) may be different from those shown in the figures and can be adjusted based on the operating parameters of the final system.

Figure 5A:
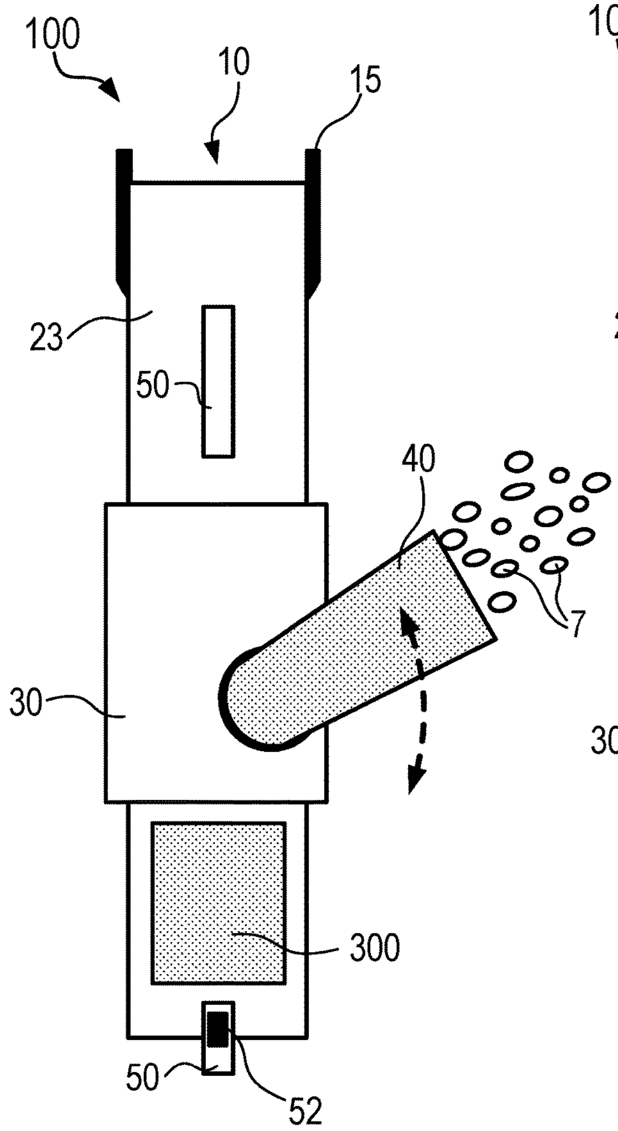
FIGS. 5A-5B provide views of an adjustable discharge chute for a handheld snow removing system, in accordance with an embodiment of the present description.
Figure 5B:
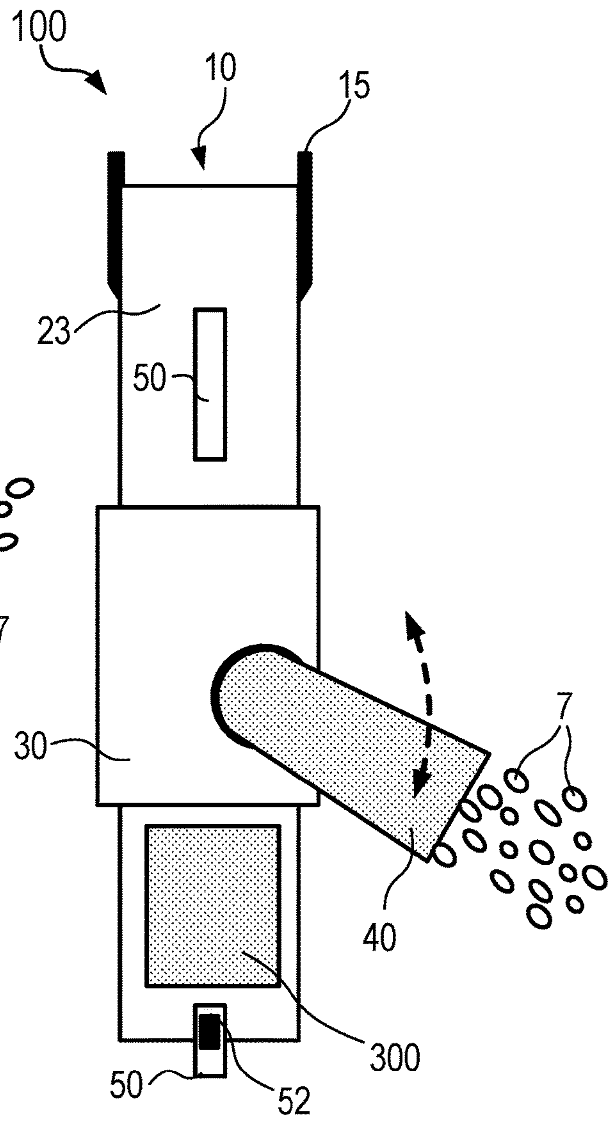

Finally, FIGS. 5A-5B provide views of adjustable discharge chute 40 for an embodiment of a handheld snow removing system 100, according to the present description. FIGS. 5A-5B provide top views of handheld snow removing system 100. It should be noted that elements shown in FIGS. 5A-5B which have the same numbers as elements of previous figures are assumed to have the same function unless otherwise specified. Therefore, these like-numbered elements of FIGS. 5A-5B may not be described further here. The intent of FIGS. 5A-5B, besides providing a top view of handheld snow removing system 100, is to show that, in some embodiments, discharge chute 40 may be adjustable. That is, the position of the discharge opening (the direction of discharge) may be adjusted by the operator so that ejected material 7 is thrown in a safe and appropriate direction away from the operator and system. In some embodiments, the adjustment of discharge chute 40 may be a simple manual adjustment by an operator (e.g., grabbing the discharge chute 40 and rotating it by hand to the proper direction), while in other embodiments, the adjustment may be achieved via an electric motor or other electro-mechanical means. In some embodiments, handheld snow removing system 100, may include one or more operator controls 52, at least one of which may be directed to adjustment of the discharge direction of discharge chute 40.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed:

1. A handheld snow removing system comprising:
an intake scoop comprising a rotating intake auger;
a discharge chute configured to direct a flow of material to a point outside of the handheld snow removing system;
a fan chamber disposed between the intake scoop and the discharge chute, the fan chamber comprising a fan configured to create a suction force within the fan chamber to create the flow of material from the intake scoop, through the fan chamber, and out through the discharge chute;
an energy-conversion device configured to drive the fan and the rotating intake auger;
a first handle positioned rearward of the fan and the discharge chute; and
a second handle positioned between the discharge chute and the intake scoop.

2. The handheld snow removing system of claim 1, wherein the energy-conversion device includes (a) a driver and (b) a singular belt coupled to the driver, the fan, and the rotating intake auger, and wherein the energy-conversion device is configured to drive the fan and the rotating intake auger.

3. The handheld snow removing system of claim 2, wherein the driver is an electric motor comprising one or more batteries.

4. The handheld snow removing system of claim 2, wherein the driver is an electric motor connected by a cord to an external source of electricity.

5. The handheld snow removing system of claim 2, wherein the driver is a gasoline-powered engine.

6. The handheld snow removing system of claim 1, wherein the intake scoop further comprises a flexible front edge configured to lift material into the intake scoop when the handheld snow removing system is directed along a surface to be cleaned.

7. A handheld snow removing system, comprising:
an intake scoop comprising:
a rotating intake auger; and
a flexible front edge configured to lift material into the intake scoop when the handheld snow removing system is directed along a surface to be cleaned, wherein the flexible front edge comprises a U-shape;
a discharge chute configured to direct a flow of material outside to a point outside the handheld snow removing system;
a fan chamber disposed between the intake scoop and the discharge chute, the fan chamber comprising a fan configured to create a suction force within the fan chamber to move material from the intake scoop, through the fan chamber, and out through the discharge chute; and
an energy conversion device configured to drive the fan and the rotating intake auger.

8. The handheld snow removing system of claim 1, wherein the rotating intake auger comprises a rotating brush.

9. The handheld snow removing system of claim 1, wherein the handheld snow removing system is configured to be lifted and operated by an operator using either one or two hands.

10. The handheld snow removing system of claim 1, further comprising a set of operator controls disposed on the first handle.

11. The handheld snow removing system of claim 1, wherein a direction of the flow of material out of the discharge chute is adjustable.

12. The handheld snow removing system of claim 1, wherein the intake scoop includes a flexible front edge having a U-shape.

13. A snow removing system designed to be held by an operator, the snow removing system comprising:

an intake scoop defining a front opening;

a discharge chute configured to direct a flow of material to a point outside the handheld snow removing system, wherein the direction of flow of material out of the discharge chute is adjustable;

a fan chamber disposed between the intake scoop and the discharge chute, wherein the fan chamber is positioned directly below the discharge chute;

a fan positioned within the fan chamber and rearward of the intake scoop;

an internal conduit configured to receive material collected by the intake scoop during operation and guide the flow of material from the intake scoop to the fan chamber;

a first handle positioned rearward of the fan and the discharge chute; and a second handle positioned between the discharge chute and the intake scoop.

14. The snow removing system of claim 13, further comprising an electric motor coupled to the fan.

15. The snow removing system of claim 14, wherein the electric motor is powered by one or more batteries.

16. The snow removing system of claim 14, wherein the electric motor is connected by a cord and receives power from an external source of electricity.

17. The snow removing system of claim 13, wherein the intake scoop further comprises a rotating intake auger.

18. The snow removing system of claim 13, wherein the internal conduit extends between the intake scoop and the fan chamber, and wherein the fan is configured to generate an internal suction force to move snow from the intake scoop, through the internal conduit, and out the discharge chute.

19. The handheld snow removing system of claim 13, wherein the intake scoop includes a flexible front edge having a U-shape.

* * * * *